United States Patent
Byun et al.

(10) Patent No.: US 10,372,277 B2
(45) Date of Patent: Aug. 6, 2019

(54) TRIBOELECTRIC DEVICE

(71) Applicant: Samsung Electronics Co., Ltd., Suwon-si, Gyeonggi-do (KR)

(72) Inventors: Kyung-Eun Byun, Seongnam-si (KR); Jae-Young Kim, Suwon-si (KR); Hyeonjin Shin, Suwon-si (KR); Alum Jung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 190 days.

(21) Appl. No.: 15/403,491

(22) Filed: Jan. 11, 2017

(65) Prior Publication Data

US 2018/0024668 A1    Jan. 25, 2018

(30) Foreign Application Priority Data

Jul. 25, 2016 (KR) .................. 10-2016-0094144

(51) Int. Cl.
*G06F 3/044* (2006.01)
*G02F 1/01* (2006.01)
*G02F 1/167* (2019.01)
*H02N 1/04* (2006.01)
*G06F 3/041* (2006.01)

(52) U.S. Cl.
CPC ............ *G06F 3/044* (2013.01); *G02F 1/0136* (2013.01); *G02F 1/167* (2013.01); *G06F 3/041* (2013.01); *H02N 1/04* (2013.01)

(58) Field of Classification Search
CPC .......... G02F 1/167; G06F 3/041; G06F 3/044; H02N 1/04
See application file for complete search history.

(56) References Cited

U.S. PATENT DOCUMENTS 6,700,695 B2   3/2004   Engler et al.
7,477,445 B2   1/2009   Lee
(Continued)

FOREIGN PATENT DOCUMENTS

JP   2002014379 A    1/2002
JP   2015041080 A    3/2015
KR   10-1418353 B1   7/2014

OTHER PUBLICATIONS

"Siple Capacity Touch Sensor Circuit Diagram," http:www.learningelectronics.net/circuits/simple-capacitive-touch-sensor.html.
(Continued)

*Primary Examiner* — Abbas I Abdulselam
(74) *Attorney, Agent, or Firm* — Harness, Dickey & Pierce, P.L.C.

(57) ABSTRACT

Example embodiments relate to a triboelectric device including first and second electrodes that are spaced apart from each other, a charging layer provided on the first electrode, a display layer, which is provided between the first and second electrodes, configured to implement an image according to a change in an electric field between the first and second electrodes, and a charging member charged with an opposite polarity to the polarity of the charging layer by contacting the charging layer, wherein the triboelectric device is configured to implement the image according to the change in the electric field between the first and second electrodes in a contact area of the charging member and the charging layer.

16 Claims, 5 Drawing Sheets

(56) References Cited

U.S. PATENT DOCUMENTS

| | | | |
|---|---|---|---|
| 2008/0030844 A1* | 2/2008 | Choi | G02F 1/167 |
| | | | 359/296 |
| 2009/0135470 A1 | 5/2009 | Lee | |
| 2009/0146991 A1* | 6/2009 | Shimodaira | G06F 3/03545 |
| | | | 345/214 |
| 2011/0102481 A1* | 5/2011 | Miyasaka | G09G 3/344 |
| | | | 345/690 |
| 2012/0044190 A1 | 2/2012 | Yilmaz | |
| 2013/0155490 A1* | 6/2013 | Zhang | G06F 3/041 |
| | | | 359/296 |
| 2016/0124555 A1* | 5/2016 | Hong | G06F 3/016 |
| | | | 345/173 |

OTHER PUBLICATIONS

Chen, Jun, et al., "Personalized Keystroke Dynamics for Self-Powered Human-Machine Interfacing," ACS Nano, vol. 9, No. 1, 2015, pp. 105-116.

* cited by examiner

TRIBOELECTRIC DEVICE

CROSS-REFERENCE TO RELATED APPLICATION

This application claims the benefit of priority from Korean Patent Application No. 10-2016-0094144, filed on Jul. 25, 2016, in the Korean Intellectual Property Office, the disclosure of which is incorporated herein in its entirety by reference.

BACKGROUND

1. Field

Example embodiments relate to triboelectric devices, and/or to triboelectric devices using a charging phenomenon due to friction between a charging member and a charging layer.

2. Description of the Related Art

Methods of representing images by using materials charged by an electric field and moved in a fluid medium have been proposed using a liquid crystal display (LCD) using a liquid crystal, a plasma display panel (PDP) using the principle of emitting light when converting gas to a plasma state, and an organic light emitting diode display (OLED) providing a display device by using a self-luminescent organic material. In particular, a method of using charged particles is referred to as an electrophoresis method, in which the charged particles move to a positive electrode or a negative electrode.

According to the electrophoresis method, an image is shown by displaying black letters on a white background. Although display devices providing a moving image in full color by using the above methods are not commercialized, the application possibility thereof as a display panel for electronic dictionaries or e-books has been receiving much attention.

SUMMARY

Example embodiments relate to a triboelectric device using a charging phenomenon due to friction between a charging member and a charging layer.

Additional example embodiments will be set forth in part in the description which follows and, in part, will be apparent from the description, or may be learned by practice of the example embodiments.

According to an example embodiment, a triboelectric device includes first and second electrodes that are spaced apart from each other, a charging layer provided on the first electrode, a display layer, which is provided between the first and second electrodes, configured to implement an image according to a change in an electric field between the first and second electrodes, and a charging member charged with an opposite polarity to the polarity of the charging layer by contacting the charging layer, wherein the triboelectric device is configured to implement the image according to the change in the electric field between the first and second electrodes in a contact area of the charging member and the charging layer.

The display layer may include a plurality of micro capsules between the first and second electrodes, and each of the micro capsules may include a plurality of first and second particles, wherein each of the first and second particles has an opposite charge to the other.

The image may be implemented as the first and second particles move according to the change in the electric field between the first and second electrodes in the contact area of the charging member and the charging layer.

The first and second particles may have black and white colors, respectively.

The first and second electrodes may be electrically connected to each other.

The charging member may be positively charged and the charging layer may be negatively charged in the contact area of the charging member and the charging layer.

Positive and negative charges may be respectively induced on first and second electrodes corresponding to the contact area.

The first electrode may include a plurality of pixel electrodes and the second electrode may include a common electrode.

The plurality of pixel electrodes and the second electrode may be electrically connected to one another.

The plurality of pixel electrodes may be grounded.

The first electrode may include a plurality of first pixel electrodes and a plurality of second pixel electrodes, and the first and second pixel electrodes may be spaced apart from each other.

The first electrode may further include at least one spacer between the plurality of first pixel electrodes and the plurality of second pixel electrodes.

The plurality of first pixel electrodes and the plurality of second pixel electrodes facing each other may be electrically connected to one another.

The charging member may be positively charged and the charging layer may be negatively charged in the contact area of the charging member and the charging layer.

Positive and negative charges may be respectively induced on the first and second pixel electrodes corresponding to the contact area.

The image may be implemented as the first and second particles move according to the change in the electric field between the first and second pixel electrodes corresponding to the contact area.

BRIEF DESCRIPTION OF THE DRAWINGS

These and/or other example embodiments will become apparent and more readily appreciated from the following description, taken in conjunction with the accompanying drawings in which.

DETAILED DESCRIPTION

Figure 1:
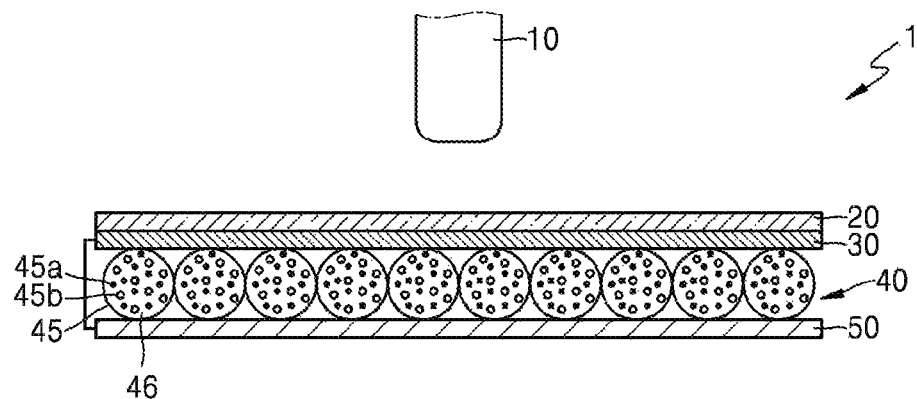
FIG. 1 is a cross-sectional view of a triboelectric device according to an example embodiment.

Reference will now be made in detail to example embodiments illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures. Expressions such as "at least one of," when preceding a list of elements, modify the entire list of elements and do not modify the individual elements of the list.

Throughout the specification, it will be understood that when a unit is referred to as being "connected" to another element, it may be "directly connected" to the other element or "electrically connected" to the other element in a state in which intervening elements are present. In addition, it will be understood that when a unit is referred to as "comprising" another element, it may not exclude the other element but may further include the other element unless specifically oppositely indicates.

FIG. 1 is a cross-sectional view of a triboelectric device 1 according to an example embodiment.

Referring to FIG. 1, the triboelectric device 1 includes a charging member 10, a charging layer 20, a first electrode 30, a display layer 40, and a second electrode 50. The first and second electrodes 30 and 50 may be spaced apart from each other. Furthermore, the display layer 40 is provided between the first and second electrodes 30 and 50, and the charging layer 20 is provided on the first electrode 30.

The charging member 10, which typically implements an image on the display layer 40 by contacting the charging layer 20, may be, for example, a writing implement such as a pen or a user's finger.

The charging member 10 may be charged with a polarity that is opposite to the polarity of the charging layer 20 by contacting the charging layer 20. For example, the charging member 10 may include a material that is positively charged by contacting the charging layer 20. For example, the charging member 10 may include polyformaldehyde, ethylcellulose, polyamide, melamine-formol, wool, silk, mica, or nylon. However, the charging member 10 is not limited thereto, and may include various materials that are provided later below and positively charged by contacting the charging layer 20.

Although it is illustratively described that the charging member 10 is positively charged by contacting the charging layer 20, the charging member 10 may also be negatively charged by contacting the charging layer 20. For example, the charging member 10 may include polytetrafluoroethylene (Teflon), polydimethylsiloxane (PDMS), polyvinyl chloride (PVC), polyimide (Kapton), polypropylene (PP), polyethylene (PE), or polystyrene (PS). However, the charging member 10 is not limited thereto, and may include various materials that are negatively charged by contacting the charging layer 20.

The charging member 10 may be doped with a p-type or n-type dopant to adjust charging characteristics of a surface thereof. A source of a p-type dopant may include, for example, an ionic liquid such as $NO_2BF_4$, $NOBF_4$, or $NO_2SbF_6$, an acidic compound such as HCl, $H_2PO_4$, $CH_3COOH$, $H_2SO_4$, or $HNO_3$, and an organic compound such as dichlorodicyanoquinone (DDQ), oxone, dimyristoylphosphatidylinositol (DMPI), or trifluoromethanesulfoneimide. Alternatively, the source of the p-type dopant may include $HPtCl_4$, $AuCl_3$, $HAuCl_4$, silver trifluoromethanesulfonate (AgOTf), $AgNO_3$, $H_2PdCl_6$, $Pd(OAc)_2$, or $Cu(CN)_2$.

A source of an n-type dopant may include, for example, a reduction product of a substituted or unsubstituted nicotinamide, a reduction product of a compound which is chemically bonded to the substituted or unsubstituted nicotinamide, and a compound comprising at least two pyridinium moieties in which a nitrogen atom of at least one of the pyridinium moieties is reduced. For example, the source of the n-type dopant may include nicotinamide mononucleotide-H (NMNH), nicotinamide adenine dinucleotide-H (NADH), nicotinamide adenine dinucleotide phosphate-H (NADPH), or viologen. Alternatively, the source of the n-type dopant may include a polymer such as polyethylenimine (PEI). Alternatively, the n-type dopant may include alkali metal such as potassium (K) or lithium (Li). Meanwhile, materials of the p-type dopant and the n-type dopant are merely examples, and various materials may be used as a dopant.

The charging layer 20 may be provided on the first electrode 30, and may include a material charged with an opposite polarity to the polarity of the charging member 10 by contacting the charging member 10. For example, the charging layer 20 may be negatively charged when the charging member 10 is positively charged. For example, the charging member 10 may include Teflon, PDMS, PVC, Kapton, PP, PE, or PS. However, the charging member 10 is not limited thereto, and may include various materials that are negatively charged by contacting the charging layer 20.

Meanwhile, the charging layer 20 may be positively charged when the charging member 10 is negatively charged. The charging layer 20 may include polyformaldehyde, ethylcellulose, polyamide, melamine-formol, wool, silk, mica, or nylon. However, the charging layer 20 is not limited thereto, and may include various materials that are positively charged by contacting the charging member 10.

The charging layer 20 may be doped with a p-type or n-type dopant to adjust charging characteristics of a surface thereof, similarly to the charging member 10 described above.

The first and second electrodes 30 and 50 may be spaced apart from each other. Each of, or one of, the first and second electrodes 30 and 50 may include a material having excellent or improved electrical conductivity. For example, each of the first and second electrodes 30 and 50 may include at least one of graphene, carbon nanotube (CNT), indium tin oxide (ITO), metal, and a conductive polymer. The metal, for example, may include at least one of silver (Ag), aluminum (Al), copper (Cu), gold (Au), nickel (Ni), chromium (Cr), and platinum (Pt), but is not limited thereto. Each of, or one of, the first and second electrodes 30 and 50 may have a structure including a single layer or a plurality of layers. Furthermore, the first and second electrodes 30 and 50 may be electrically connected to each other.

The display layer 40 may be provided between the first and second electrodes 30 and 50. The display layer 40 may implement an image according to a change in an electric field between the first and second electrodes 30 and 50. The display layer 40 may include a plurality of micro capsules 45. The plurality of micro capsules 45 may include urethane resin or urea resin, but are not limited thereto.

Each of, or at least one of, the micro capsules 45 may include a solvent 46 and a plurality of first and second particles 45a and 45b dispersed in the solvent 46. The solvent 46 may include, for example, any one of water, alcohols, esters, ketones, aliphatic hydrocarbon, aromatic hydrocarbon, halogenized hydrocarbon, and carboxylic acid, or any one of combinations thereof, but is not limited thereto.

Each of, or one of, the first and second particles 45a and 45b may have a charge of opposite polarity to the polarity of the other. For example, the second particles 45b may be negatively charged when the first particles 45a are positively charged, and the second particles 45b may be positively charged when the first particles 45a are negatively charged.

For example, the first and second particles 45a and 45b may have black and white colors, respectively. The black first particles 45a may be formed by using carbon, and the white second particles 45b may be formed by using ITO. In some cases, the first particles 45a may be white and the second particles 45b may be black.

Figure 2A:
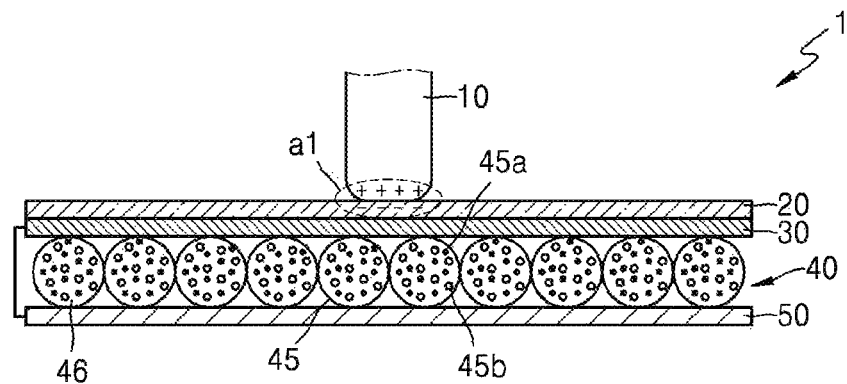
FIGS. 2A and 2B are views of a triboelectric device implementing an image according to the example embodiment of FIG. 1.
Figure 2B:
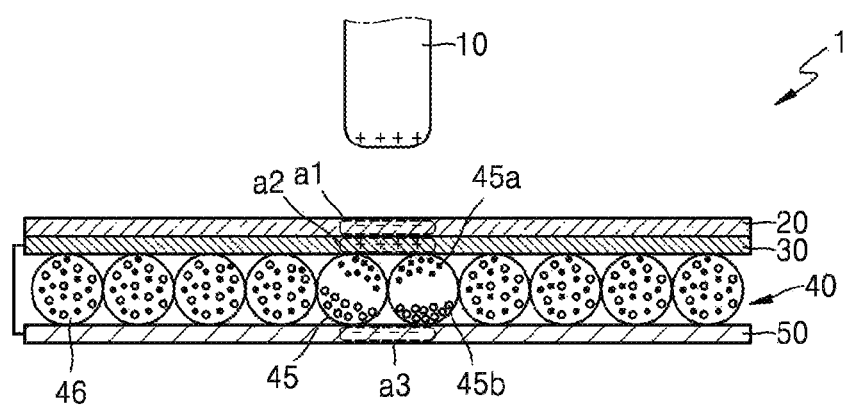

In the triboelectric device 1 having the structure described above, the display layer 40 may implement a certain image as the electric field between the first and second electrodes 30 and 50 is changed in a contact area of the charging member 10 and the charging layer 20. Hereinafter, the operation of the triboelectric device 1 implementing an image in FIG. 1 will be described in detail referring to FIGS. 2A and 2B. FIGS. 2A and 2B are views of the triboelectric device 1 implementing an image according to the example embodiment of FIG. 1. In more detail, FIG. 2A illustrates a contact state of the charging member 10 and the charging layer 20 in the triboelectric device 1, and FIG. 2B illustrates a separation state of the charging member 10 and the charging layer 20 after contacting each other in the triboelectric device 1.

Referring to FIG. 2A, when the charging member 10 contacts the charging layer 20, each of the charging member 10 and the charging layer 20 may be charged with an opposite polarity to the polarity of the other in a contact area a1. FIG. 2A illustrates a case where the charging member 10 is positively charged and the charging layer 20 is negatively charged in the contact area a1 of the charging member 10 and the charging layer 20. Since the charging member 10 and the charging layer 20 are electrically neutral in the state of the charging member 10 contacting the charging layer 20, there is substantially no movement of charge between the first and second electrodes 30 and 50.

Referring to FIG. 2B, when the charging member 10 are separated from the charging layer 20 after contacting each other, the charging member 10 may maintain a state of being positively charged and the charging layer 20 may maintain a state of being negatively charged. In this case, a charge of each of the first and second electrodes 30 and 50, which is of opposite polarity to the polarity of the other, may be induced on each of the first and second electrodes 30 and 50 by the negative charge in the contact area a1 of the charging layer 20. In more detail, a positive charge may be induced on a first electrode area a2 and a negative charge may be induced on a second electrode area a3, in which each of the positive charge and the negative charge corresponds to the contact area a1 of the charging layer 20. Therefore, an electric field may be generated between the first and second electrodes 30 and 50, and thus, the black first particles 45a having a negative charge may move to the first electrode 30, and the white second particles 45b having a positive charge may move to the second electrode 50. Therefore, the display layer 40 may be black in a contact area of the charging member 10 and the charging layer 20.

As described above, the triboelectric device 1 may implement a black image in a desired shape by a user contacting a desired area of the charging layer 20 with the charging member 10. Furthermore, when the user moves the charging member 10 in the state of contacting the charging layer 20 with the charging member 10, letters and images may be displayed in black on a white background.

Figure 3:
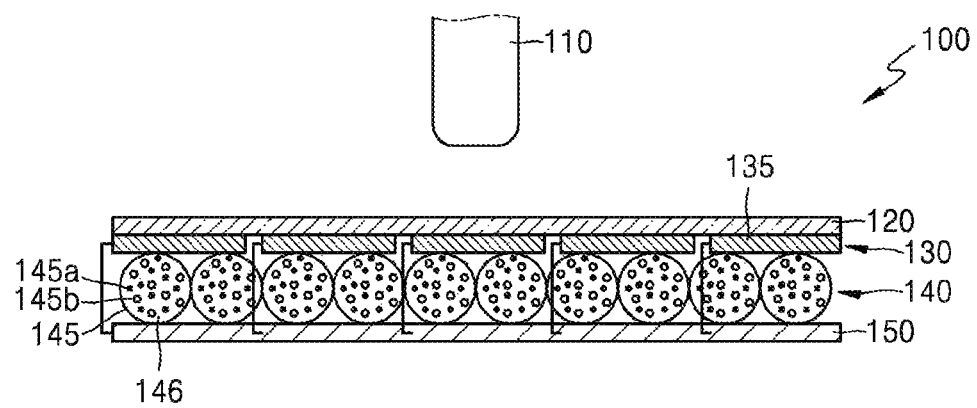
FIG. 3 is a cross-sectional view of a triboelectric device according to another example embodiment.

FIG. 3 is a cross-sectional view of a triboelectric device 100 according to another example embodiment.

Referring to FIG. 3, the triboelectric device 100 includes a charging member 110, a charging layer 120, a first electrode 130, a display layer 140, and a second electrode 150. The first and second electrodes 130 and 150 may be spaced apart from each other. Furthermore, the display layer 140 is provided between the first and second electrodes 130 and 150, and the charging layer 120 is provided on the first electrode 130.

The charging member 110, which is for implementing an image on the display layer 140 by contacting the charging layer 120, may be, for example, a writing implement such as a pen or a user's finger.

The charging member 110 may be charged with an opposite polarity to the polarity of the charging layer 120 by contacting the charging layer 120. For example, the charging member 110 may include a material positively charged by contacting the charging layer 120. Although it is described that the charging member 110 is positively charged by contacting the charging layer 120, the charging member 110 may also be negatively charged by contacting the charging layer 120. The material in the charging member 110 may be the same as the material in the charging member 10 described above with reference to FIG. 1, and thus, repeated descriptions thereof are omitted.

The charging layer 120 may be provided on the first electrode 130, and may include a material charged with an opposite polarity to the polarity of the charging member 110 by contacting the charging member 110. For example, the charging layer 120 may be negatively charged when the charging member 110 is positively charged. For example, the charging layer 120 may include Teflon, PDMS, PVC, Kapton, PP, PE, or PS. However, the charging layer 120 is not limited thereto, and may include various materials that are negatively charged by contacting the charging member 110.

Meanwhile, the charging layer 120 may be positively charged when the charging member 110 is negatively charged. The charging layer 120 may include polyformaldehyde, ethylcellulose, polyamide, melamine-formol, wool, silk, mica. or nylon. However, the charging layer 120 is not limited thereto, and may include various materials that are positively charged by contacting the charging member 110.

The charging layer 120 may be doped with a p-type or n-type dopant to adjust charging characteristics of a surface thereof, similarly to the charging member 110 described above.

The first and second electrodes 130 and 150 may be spaced apart from each other. The first electrode 130 may include a plurality of pixel electrodes 135 and the second electrode 150 may include a common electrode. Furthermore, each of the first and second electrodes 130 and 150 may include a material having excellent or improved electrical conductivity. For example, each of, or one of, the first and second electrodes 130 and 150 may include at least one of graphene, CNT, ITO, metal, and a conductive polymer. The metal, for example, may include at least one of Ag, Al, Cu, Au, Ni, Cr, and Pt, but is not limited thereto. Each of, or one of, the first and second electrodes 130 and 150 may have a structure including a single layer or a plurality of layers. Each of, or at least one of, the pixel electrodes 135 in the first electrode 130 may be electrically connected to the second electrode 150. Furthermore, the plurality of pixel electrodes 135 may be grounded.

The display layer 140 may be provided between the first and second electrodes 130 and 150. The display layer 140 may implement an image according to a change in an electric field between the first and second electrodes 130 and 150. The display layer 140 may include a plurality of micro capsules 145. The plurality of micro capsules 145 may include urethane resin or urea resin, but are not limited thereto.

Each of, or at least one of, the micro capsules 145 may include a solvent 146 and a plurality of first and second particles 145a and 145b dispersed in the solvent 146. The solvent 146 may include, for example, any one of water, alcohols, esters, ketones, aliphatic hydrocarbon, aromatic hydrocarbon, halogenized hydrocarbon, and carboxylic acid, or any one of combinations thereof, but is not limited thereto.

Each of, or at least one of, the first and second particles 145a and 145b may have a charge of opposite polarity to the polarity of the other. For example, the second particles 145b may be negatively charged when the first particles 145a are positively charged, and the second particles 145b may be positively charged when the first particles 145a are negatively charged.

For example, the first and second particles 145a and 145b may have black and white colors, respectively. The black first particles 145a may be formed by using carbon, and the white second particles 145b may be formed by using ITO. In some cases, the first particles 145a may be white and the second particles 145b may be black.

Figure 4A:
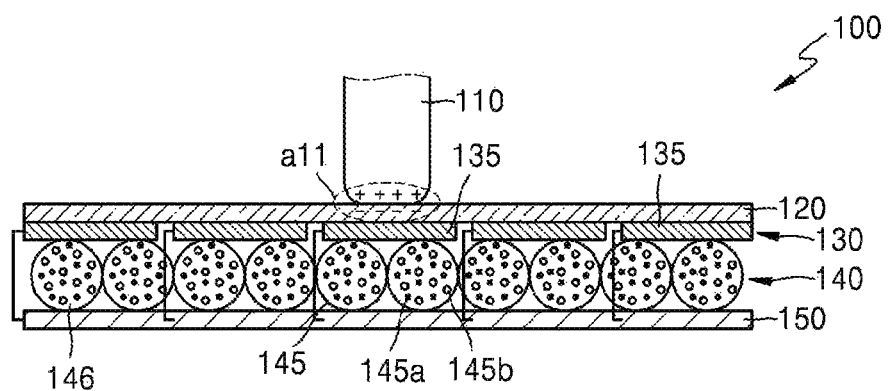
FIGS. 4A and 4B are views of a triboelectric device implementing an image according to the example embodiment of FIG. 3.
Figure 4B:
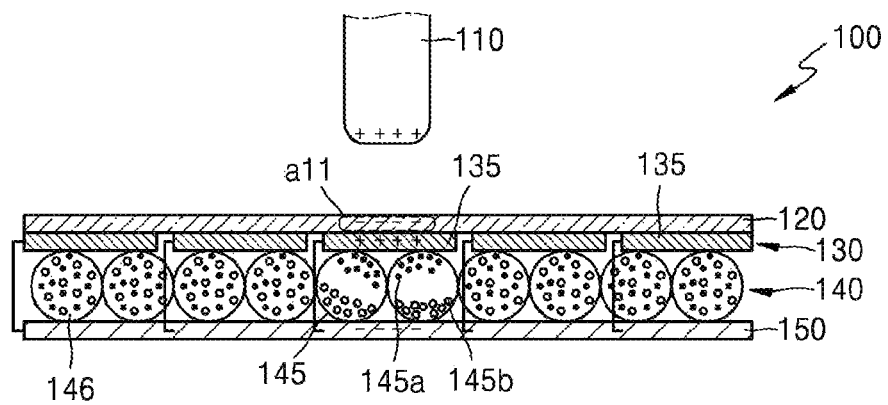

In the triboelectric device 100 having the structure described above, the display layer 140 may implement a certain image as the electric field between the first and second electrodes 130 and 150 is changed in a contact area of the charging member 110 and the charging layer 120. Hereinafter, the operation of the triboelectric device 100 implementing an image in FIG. 3 will be described in detail referring to FIGS. 4A and 4B. FIGS. 4A and 4B are views of the triboelectric device 100 implementing an image according to another example embodiment of FIG. 3. In more detail, FIG. 4A illustrates a contact state of the charging member 110 and the charging layer 120 in the triboelectric device 100, and FIG. 4B illustrates a separation state of the charging member 110 and the charging layer 120 after contacting each other in the triboelectric device 100.

Referring to FIG. 4A, when the charging member 110 contacts the charging layer 120, each of, or one of, the charging member 110 and the charging layer 120 may be charged with an opposite polarity to the polarity of the other in a contact area a11. FIG. 4A illustrates a case where the charging member 110 is positively charged and the charging layer 120 is negatively charged in the contact area a11 of the charging member 110 and the charging layer 120. Since the charging member 110 and the charging layer 120 are electrically neutral in the state of the charging member 110 contacting the charging layer 120, there is no movement of charge between the first and second electrodes 130 and 150.

Referring to FIG. 4B, when the charging member 110 is separated from the charging layer 120 after contacting each other, the charging member 110 may maintain a state of being positively charged and the charging layer 120 may maintain a state of being negatively charged. In this case, a charge of each of the pixel electrodes 135 and the second electrode 150 corresponding to the contact area a11, which is of opposite polarity to the polarity of the other, may be induced on each of the pixel electrodes 135 and the second electrode 150 by the negative charge in the contact area a11 of the charging layer 120. In more detail, a positive charge may be induced on the pixel electrodes 135 and a negative charge may be induced on the second electrode 150, in which each of the positive charge and the negative charge corresponds to the contact area a11 of the charging layer 120. Therefore, an electric field may be generated between the pixel electrodes 135 and the second electrode 150, and thus, the black first particles 145a having a negative charge may move to the pixel electrodes 135, and the white second particles 145b having a positive charge may move to the second electrode 150. Therefore, the display layer 140 may be black in a contact area of the charging member 110 and the charging layer 120.

As described above, the triboelectric device 100 may implement a black image in a desired shape by a user, or an object, contacting a desired area of the charging layer 120 with the charging member 110. Furthermore, when the user of the charging member 110 moves in the state of contacting the charging layer 120 with the charging member 110, letters and images may be displayed in black on a white background.

Figure 5:
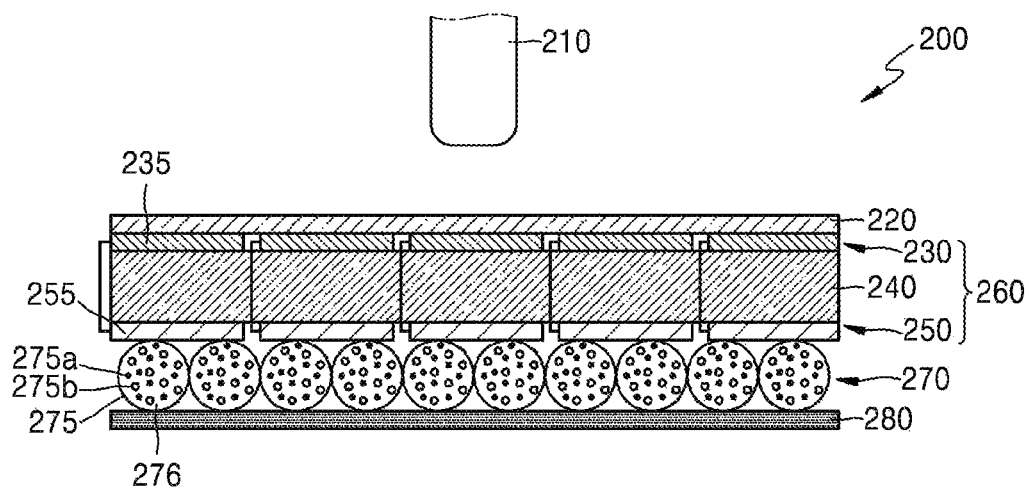
FIG. 5 is a cross-sectional view of a triboelectric device according to another example embodiment.

FIG. 5 is a cross-sectional view of a triboelectric device 200 according to another example embodiment.

Referring to FIG. 5, the triboelectric device 200 includes a charging member 210, a charging layer 220, a first electrode 260, a display layer 270, and a second electrode 280. The first and second electrodes 260 and 280 may be spaced apart from each other. Furthermore, the display layer 270 is provided between the first and second electrodes 260 and 280, and the charging layer 220 is provided on the first electrode 260.

The charging member 210, which is for implementing an image on the display layer 270 by contacting the charging layer 220, may be, for example, a writing implement such as a pen, object, or a user's finger.

The charging member 210 may be charged with an opposite polarity to the polarity of the charging layer 220 by contacting the charging layer 220. For example, the charging member 210 may include a material positively charged by contacting the charging layer 220. Although it is described that the charging member 210 is positively charged by contacting the charging layer 220, the charging member 210 may also be negatively charged by contacting the charging layer 220. The material in the charging member 210 may be the same as the material in the charging member 10 described above with reference to FIG. 1, and thus, repeated descriptions thereof are omitted.

The charging layer 220 may be provided on the first electrode 260, and may include a material charged with an opposite polarity to the polarity of the charging member 210 by contacting the charging member 210. For example, the charging layer 220 may be negatively charged when the charging member 210 is positively charged. For example, the charging layer 220 may include Teflon, PDMS, PVC, Kapton, PP, PE, or PS. However, the charging layer 220 is not limited thereto, and may include various materials that are negatively charged by contacting the charging member 210.

Meanwhile, the charging layer 220 may be positively charged when the charging member 210 is negatively charged. The charging layer 120 may include polyformaldehyde, ethylcellulose, polyamide, melamine-formol, wool, silk, mica. or nylon. However, the charging layer 220 is not limited thereto, and may include various materials that are positively charged by contacting the charging member 210.

The charging layer 220 may be doped with a p-type or n-type dopant to adjust charging characteristics of a surface thereof, similarly to the charging member 210 described above.

The first and second electrodes 260 and 280 may be spaced apart from each other. The first electrode 260 may include a plurality of first pixel electrodes 230 and a plurality of second pixel electrodes 250. The plurality of first pixel electrodes 230 and the plurality of second pixel electrodes 250 may face each other respectively and may be spaced apart from each other. The plurality of first pixel electrodes 230 and the plurality of second pixel electrodes 250 facing each other may be electrically connected to one another. Furthermore, each of, or one of, the first and second pixel electrodes 230 and 250 may include a material having excellent or improved electrical conductivity. For example, each of the first and second pixel electrodes 230 and 250 may include at least one of graphene, CNT, ITO, metal, and a conductive polymer. The metal, for example, may include at least one of Ag, Al, Cu, Au, Ni, Cr, and Pt, but is not limited thereto. Each of the first and second pixel electrodes 230 and 250 may have a structure including a single layer or layers. Furthermore, the first electrode 260 may further include at least one spacer 240 between the plurality of first pixel electrodes 230 and the plurality of second pixel electrodes 250.

The display layer 270 may be provided between a plurality of second pixel electrodes 255 and the second electrode 280. The display layer 270 may implement an image according to a change in an electric field between the plurality of second pixel electrodes 255 and the second electrode 280. The display layer 270 may include a plurality of micro capsules 275. The plurality of micro capsules 275 may include urethane resin or urea resin, but are not limited thereto.

Each of the micro capsules 275 may include a solvent 276 and a plurality of first and second particles 275a and 275b dispersed in the solvent 276. The solvent 276 may include, for example, any one of water, alcohols, esters, ketones, aliphatic hydrocarbon, aromatic hydrocarbon, halogenized hydrocarbon, and carboxylic acid, or any one of combinations thereof, but is not limited thereto.

Each of the first and second particles 275a and 275b may have a charge of opposite polarity to the polarity of the other. For example, the second particles 275b may be negatively charged when the first particles 275a is positively charged, and the second particles 275b may be positively charged when the first particles 275a is negatively charged.

For example, the first and second particles 275a and 275b may have black and white colors, respectively. The black first particles 275a may be formed by using carbon, and the white second particles 275b may be formed by using ITO. In some cases, the first particles 275a may be white and the second particles 275b may be black.

In the triboelectric device 200 having the structure described above, the display layer 270 may implement a certain image as the electric field between the plurality of second pixel electrodes 255 and the second electrode 280 is changed in a contact area of the charging member 210 and the charging layer 220. Hereinafter, the operation of the triboelectric device 200 implementing an image in FIG. 5 will be described in detail referring to FIGS. 6A and 6B.

Figure 6A:
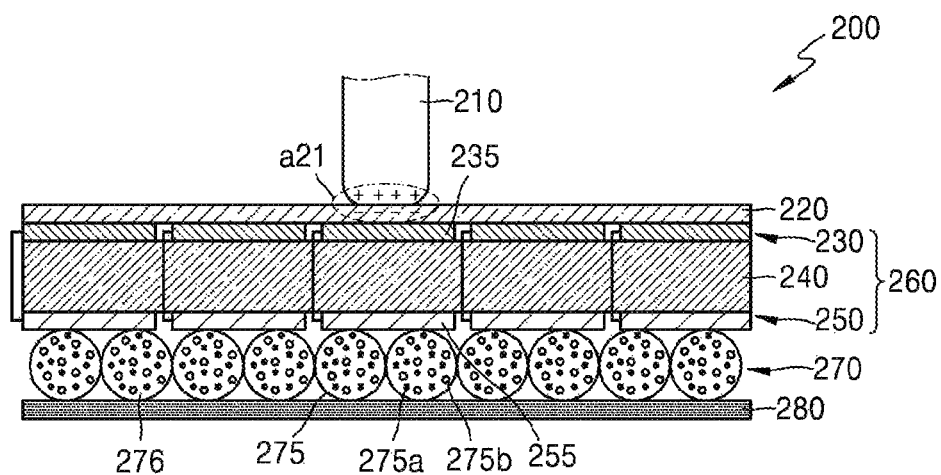
FIGS. 6A and 6B are views of a triboelectric device implementing an image according to the example embodiment of FIG. 5.
Figure 6B:
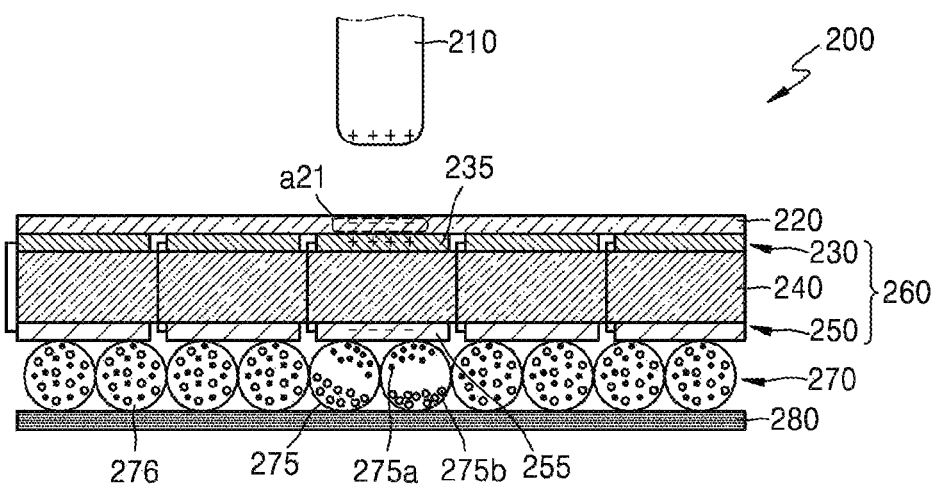

FIGS. 6A and 6B are views of the triboelectric device 200 implementing an image according to another example embodiment of FIG. 5. In more detail, FIG. 6A illustrates a contact state of the charging member 210 and the charging layer 220 in the triboelectric device 200, and FIG. 6B illustrates a separation state of the charging member 210 and the charging layer 220 after contacting each other in the triboelectric device 200.

Referring to FIG. 6A, when the charging member 210 contacts the charging layer 220, each of the charging member 210 and the charging layer 220 may be charged with an opposite polarity to the polarity of the other in a contact area a21 of the charging member 210 and the charging layer 220. FIG. 6A illustrates a case where the charging member 210 is positively charged and the charging layer 220 is negatively charged in the contact area a21 of the charging member 210 and the charging layer 220. Since the charging member 210 and the charging layer 220 are electrically neutral in the state of the charging member 210 contacting the charging layer 220, there is no movement of charge between a plurality of first pixel electrodes 235 and the plurality of second pixel electrodes 255.

Referring to FIG. 6B, when the charging member 210 are separated from the charging layer 220 after contacting each other, the charging member 210 may maintain a state of being positively charged and the charging layer 220 may maintain a state of being negatively charged. In this case, a charge of each of a first pixel electrode 235 and a second pixel electrode 255 corresponding to the contact area a21, which is of opposite polarity to the polarity of the other, may be induced on each of the first pixel electrode 235 and the second pixel electrode 255 by the negative charge in the contact area a21 of the charging layer 220. In more detail, a positive charge may be induced on the pixel electrode 235 and a negative charge may be induced on the second pixel electrode 255, in which each of the positive charge and the negative charge corresponds to the contact area a21 of the charging layer 220. Therefore, an electric field may be generated between the pixel electrode 235 and the second electrode 280, and thus, the black first particles 275a having a positive charge may move to the second pixel electrode 255, and the white second particles 275b having a negative charge may move to the second electrode 280. Therefore, the display layer 270 may be black in a contact area of the charging member 210 and the charging layer 220.

As described above, the triboelectric device 200 may implement a black image in a desired shape by a user contacting a desired area of the charging layer 220 with the charging member 210. Furthermore, when the user moves the charging member 210 in the state of contacting the charging layer 220 with the charging member 210, letters and images may be displayed in black on a white background.

A triboelectric device according to the example embodiment described above may implement an image according to a change in an electric field generated due to friction between a charging member and a charging layer. Therefore, the triboelectric device may be driven with low power consumption without external power supply. Furthermore, the triboelectric device according to the example embodiment may be produced at a relatively low cost and may also have a small thickness because the triboelectric device does not need to have power, a touch sensor, and a driving circuit.

The example embodiments are examples, and thus, it will be understood by those of ordinary skill in the art that various changes in form and details may be made therein without departing from the spirit and scope thereof. Therefore, the example embodiments should be considered in descriptive sense only and not for purposes of limitation. For example, each constituent element that is described as a singular form may be embodied in distribution forms. Also, constituent elements that are described in distribution forms may be embodied in a combined form.

Therefore, the scopes of the example embodiments are defined not by the detailed description but by the appended claims, and all differences within the scope will be construed as being included in the example embodiments.

It should be understood that example embodiments described herein should be considered in a descriptive sense only and not for purposes of limitation. Descriptions of features within each example embodiment should typically be considered as available for other similar features in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A triboelectric device comprising:
a first electrode and a second electrode spaced apart from each other;
a charging layer on the first electrode;
a display layer between the first and second electrodes, the display layer being configured to implement an image according to a change in an electric field between the first and second electrodes; and
a charging member configured to be charged with an opposite polarity to a polarity of the charging layer when contacting the charging layer, wherein
the triboelectric device is configured to implement the image according to the change in the electric field between the first and second electrodes without external power supply when the charging member contacts the charging layer and the charging member and the charging layer are charged with opposite polarities to each other in a contact area of the charging member and the charging layer,
wherein the second electrode is positioned below the first electrode such that the electric field is formed vertically to the charging layer.

2. The triboelectric device of claim 1, wherein
the display layer includes a plurality of micro capsules between the first and second electrodes, and each of the micro capsules includes a plurality of first and second particles, wherein one of the first and second particles has a charge of opposite polarity to a polarity of another one of the first and second particles.

3. The triboelectric device of claim 2, wherein
the first and second particles are configured to move according to the change in the electric field between the first and second electrodes in the contact area of the charging member and the charging layer in order to implement the image.

4. The triboelectric device of claim 3, wherein
the first and second particles have black and white colors, respectively.

5. The triboelectric device of claim 2, wherein
the first electrode comprises a plurality of first pixel electrodes and a plurality of second pixel electrodes, and the first and second pixel electrodes are spaced apart from each other.

6. The triboelectric device of claim 5, wherein
the first electrode further comprises at least one spacer between the plurality of first pixel electrodes and the plurality of second pixel electrodes.

7. The triboelectric device of claim 5, wherein
the plurality of first pixel electrodes and the plurality of second pixel electrodes facing each other are electrically connected to one another.

8. The triboelectric device of claim 7, wherein
the charging member is positively charged and the charging layer is negatively charged in the contact area of the charging member and the charging layer.

9. The triboelectric device of claim 8, wherein
positive and negative charges are respectively induced on the first and second pixel electrodes corresponding to the contact area.

10. The triboelectric device of claim 9, wherein
the first and second particles are configured to move according to the change in the electric field between the first and second pixel electrodes corresponding to the contact area to implement the image.

11. The triboelectric device of claim 1, wherein
the first and second electrodes are electrically connected to each other.

12. The triboelectric device of claim 11, wherein
the charging member is positively charged and the charging layer is negatively charged in the contact area of the charging member and the charging layer.

13. The triboelectric device of claim 12, wherein
positive and negative charges are respectively induced on first and second electrodes corresponding to the contact area.

14. The triboelectric device of claim 1, wherein
the first electrode includes a plurality of pixel electrodes and the second electrode includes a common electrode.

15. The triboelectric device of claim 14, wherein
the plurality of pixel electrodes and the second electrode are electrically connected to one another.

16. The triboelectric device of claim 14, wherein
the plurality of pixel electrodes are grounded.

* * * * *